Sept. 21, 1943.   L. W. GODDU   2,329,713
LENS EDGING DEVICE
Filed Jan. 17, 1942   2 Sheets-Sheet 1
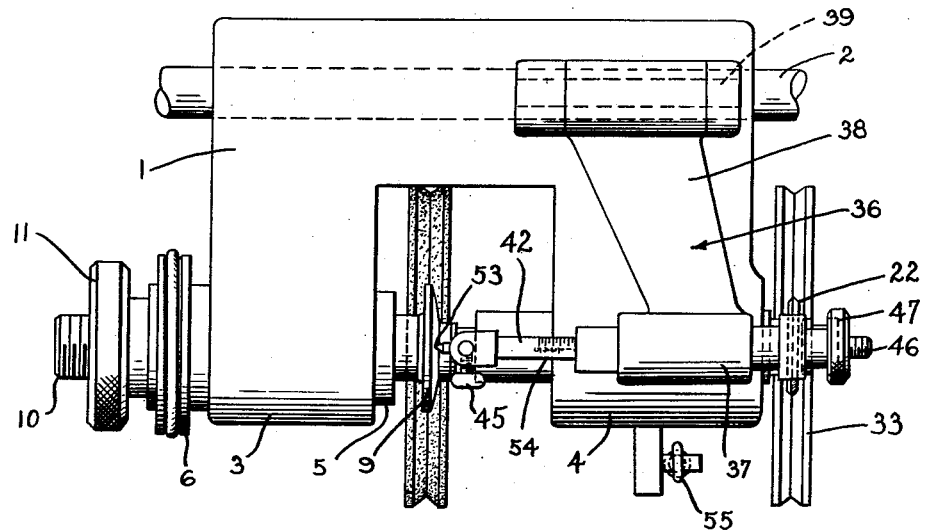
Fig. I
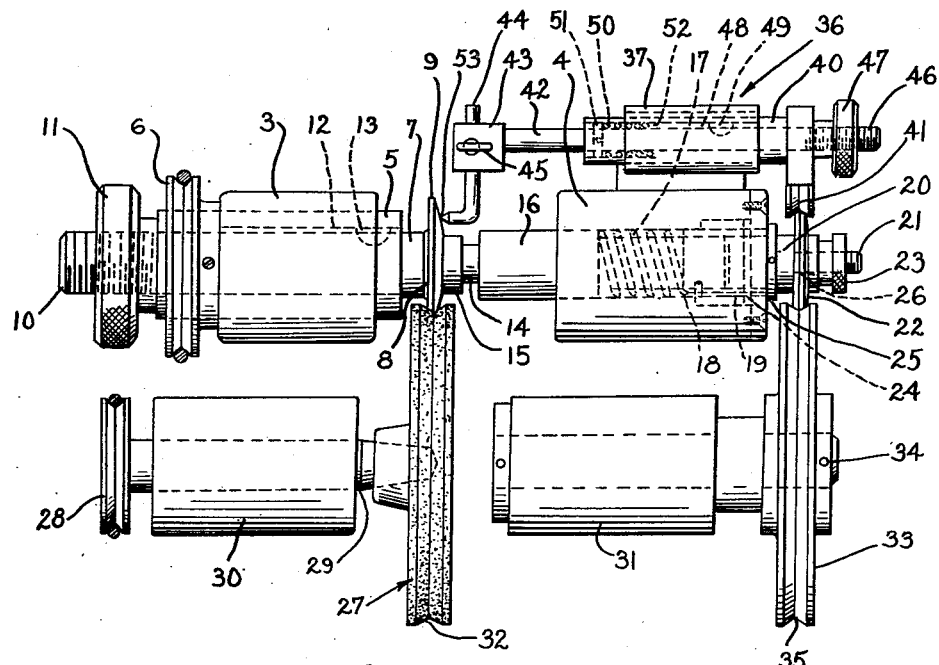
Fig. II
INVENTOR
LLOYD W. GODDU
BY
Louis L. Gagnon
ATTORNEY Sept. 21, 1943.  L. W. GODDU  2,329,713
LENS EDGING DEVICE
Filed Jan. 17, 1942  2 Sheets-Sheet 2
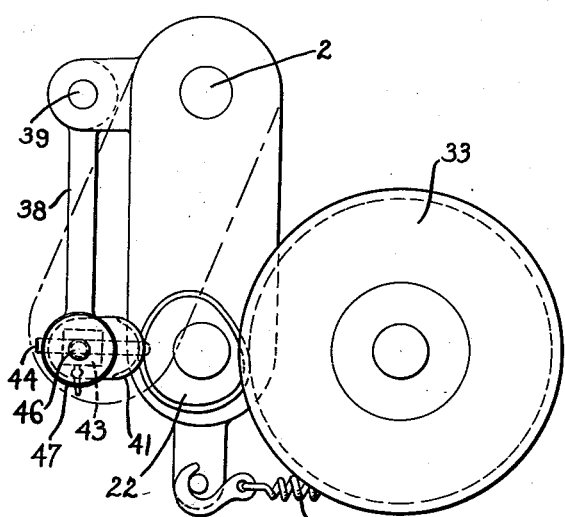
Fig. III
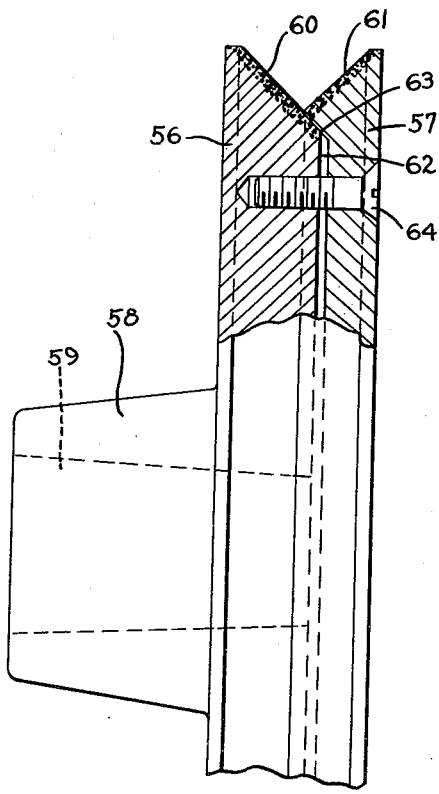
Fig. IV
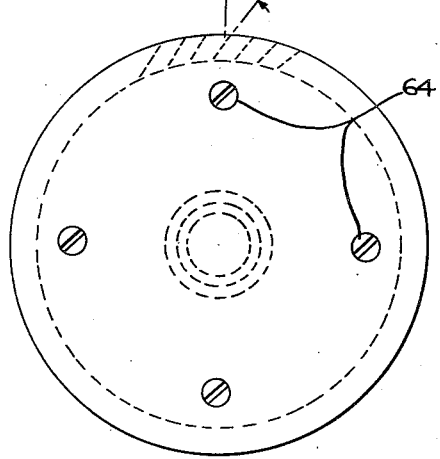
Fig. V
Fig. VI    Fig. VII
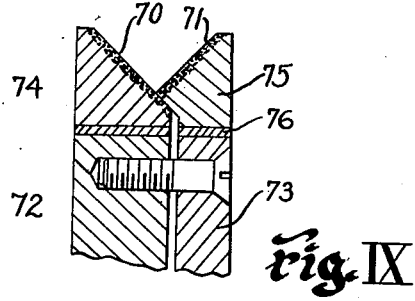
Fig. IX
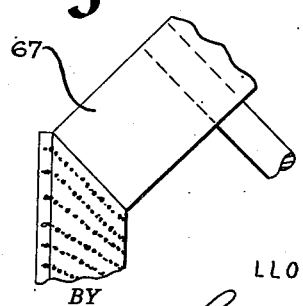
Fig. VIII
INVENTOR
LLOYD W. GODDU
BY
Louis L. Gagnon
ATTORNEY Patented Sept. 21, 1943

2,329,713

UNITED STATES PATENT OFFICE 2,329,713

LENS EDGING DEVICE

Lloyd W. Goddu, Southbridge, Mass., assignor to American Optical Company, Southbridge, Mass., a voluntary association of Massachusetts Original application May 27, 1939, Serial No. 276,071. Divided and this application January 17, 1942, Serial No. 427,152

6 Claims. (Cl. 51—101)

This invention relates to improvements in abrading and has particular reference to a novel abrading apparatus and tool and novel methods of abrading embodying said apparatus and tool.

This application is a division of my co-pending application Serial No. 276,071, filed May 27, 1939.

One of the principal objects of the invention is to provide an abrading apparatus and tool for forming a bevelled surface on a piece of work wherein the said work may be fed directly into the bevel of the tool and has particular reference to a novel method of abrading and making the apparatus and tool for said abrading.

Another object is to provide an abrading tool for bevelling the edges of lenses wherein both surfaces of the bevel may be formed simultaneously with substantially little wear on the tool and by feeding the edge of the lens directly into the bevel forming edge of said tool.

Another object is to provide a novel arrangement and method of bevelling lenses whereby the position of the apex of the bevel on the finished lens may be positively controlled.

Another object is to provide a lens bevelling apparatus and improved tool therefor whereby the lens may be reduced to desired shape and the bevel simultaneously formed thereon in one complete revolution of said lens in engagement with the abrading tool.

Another object is to provide a novel bevelling tool and method of making the same whereby the tool may be easily trued at different intervals during the use thereof and with which a sharp bevel may be formed on the lens or means being bevelled.

Another object is to provide a novel abrading tool and method of making same wherein the main body portion of the tool is formed of metal of disc shape having a peripheral portion formed of separate sections so joined as to produce a bevelled circumferential groove throughout the edge of the disc with the said groove impregnated with particles of abrasive material.

Another object is to provide novel methods of producing abrading tools having the abrading surface thereof formed of particles of crushed diamonds or other hard abrasive materials.

Another object is to provide a novel method of making abrading tools of the above character wherein the line of abrasion during the use of the tool will extend substantially throughout the entire width of the effective abrading surface of the tool.

Other objects and advantages of the invention will become apparent from the following description taken in connection with the accompanying drawings and it will be apparent that many changes may be made in the details of construction, arrangement of parts and methods shown and described without departing from the spirit of the invention as expressed in the accompanying claims.

I, therefore, do not wish to be limited to the exact details, arrangements and methods shown and described as the preferred forms only have been given by way of illustration.

Referring to the drawings:

Fig. I is a front elevation;

Fig. II is a bottom plan view of the device illustrated in Fig. I;

Fig. III is an end elevation of the device illustrated in Fig. I;

Fig. IV is a detailed edge elevation of improved abrading tool used in the device embodying the invention;

Fig. V is a side elevation of the tool illustrated in Fig. IV;

Figs. VI, VII and VIII are fragmentary views illustrating various steps in the process of manufacturing the tool illustrated in Fig. IV; and Fig. IX is a fragmentary section view of a modified form of the tool.

Abrading machines for forming a bevelled edge on a lens whereby both of the opposing edges of the lens are bevelled simultaneously are not new in the art. It has been usual, however, in most prior art instances to use abrading tools of a composite material which is readily susceptible to wear. Bevelled edging machines embodying such tools therefore made it necessary to angularly dispose the lens relative to the bevel of the tool so as to avoid having the lens reach the extreme apex of the bevel. This is because of the fact that the quick wearing nature of the material of the tool would not permit a sharp bevel to be formed on the lens if the said lens were fed directly into the bevelled face of said tool. The quick wearing nature of such tools if fed directly in the groove of the tool would result in the apex soon becoming rounded and thereby forming a similar rounded edge at the apex of the bevel formed on the lens or work. Such prior art tools, due to their nature of being readily susceptible to wear, constantly necessitated truing with the result that the diameter of such tools were constantly changed and made it necessary to provide adjustable means for compensating for said wear whereby the tool and work could be positioned in desired abrading relation with each other so as to control the resultant size or diameter of the lens.

The present invention, therefore, is directed particularly to overcoming the difficulties of the above prior art arrangements through the provision of an abrading tool which is resistant to wear, which will allow the lens to be fed directly into the apex of the bevel of the tool and enable the position of the apex of the resultant bevel on the lens to be controlled relative to the opposed surfaces of the lens.

Another advantage of the present invention is that the lenses do not have to be constantly revolved but only need one complete revolution to complete the bevelling process. This distinguishes from the prior art bevelling devices in that it has been usual in the prior art to rotate the lens throughout a plurality of cycles of movement in order to reduce the lens to the desired size and contour shape. With the present invention the size and contour shape may be formed in a single revolution of the lens.

Another advantage of the present invention is that novel means and method of forming an abrading tool has been provided whereby the tool may be quickly and easily trued at different intervals during the use thereof which truing results in only a slight change in the initial diameter of the abrading tool so that only a slight and controllable adjustment for compensating for the wear of the tool is necessary as compared with most prior art devices.

Referring more particularly to the drawings wherein like characters of reference designate like parts throughout the several views, the apparatus of the device embodying the invention, as illustrated diagrammatically in Figs. I to III inclusive, comprises a head 1 mounted for swinging movement on an upper shaft 2 suitably supported by conventional bearing brackets or the like in the finished device. These brackets are of conventional type and are not shown. The head depends from the shaft 2 and constitutes a bifurcated portion having bearings 3 and 4 in the spaced branches thereof. As shown in Fig. II, the bearing 3 has a sleeve 5 rotatably supported therein and carrying a drive pulley, gear or the like 6 by which said sleeve may be rotated. Internally of said bearing. Internally of the sleeve 5 there is provided a stud shaft 7 having a bearing pad 8 adjacent one end thereof for engaging the side surface of the lens or work 9. The opposing end 10 of the stud shaft is threaded and is provided with a hand nut 11 by which said stud shaft 7 may be adjusted longitudinally to variable positions relative to the bearing 3. Said sleeve 5 is provided with a slot 12 in which a key 13, carried by the stud shaft 9, is slidably mounted. This slot 12 and key 13 connect the said sleeve 5 and stud shaft 7 for simultaneous rotation. The opposing bearing 4 has a stud shaft 14 slidably mounted therein. The shaft 14 has a bearing pad 15 for engaging the opposed side surface of the work or lens 9. The stud shaft 14 is provided with an enlarged slide portion 16 operably fitted within the internal bore of the bearing 4. A suitable coil spring or the like 17 is adapted to engage the enlarged portion 16 adjacent one end thereof and to engage the end 18 of a sleeve 19 internally of the bearing 4 adjacent its opposed end so as to constantly urge the bearing pad 15 into engagement with the work or lens 9 and urge said lens into engagement with the bearing pad 8. The stud shaft 14, internal of the bearing 4, is fitted within and keyed to the sleeve 19 in such a manner that the stud shaft may be moved longitudinally of said sleeve and yet be interlocked so as to rotate therewith. The sleeve 19 has a solid end 20 provided with a reduced portion 21 on which a suitable former 22 may be locked by a clamp nut or the like 23. The sleeve 19 is held against longitudinal movement relative to the bearing 4 by an internal integral flange 24 and by an external collar 25.

It is to be noted that the former 22 and lens or work 9 are positioned in axial relation with each other. Suitable means, such as a tongue and grooved connection 26 between the former and the support therefor, automatically positions the former in desired meridianal location. This is a conventional type of connection and for this reason, is not shown in detail.

The work or lens 9 is adapted to be held in engagement with a bevel tool 27 which is rotated by means of a pulley, gear or the like 28 through any suitable source of power. The tool 27 is mounted on a shaft 29 rotatably supported in the bearing 30, and the driving pulley or gear 28 is secured adjacent the outer end of the shaft. The tool 27 is so constructed as to have a V-shaped groove 32 in the circumferential edge thereof and the face of the groove is preferably impregnated with particles of abrasive such as crushed diamonds, sapphires, or any other known abrasive particles. The specific characteristics of this tool will later be described more in detail.

A contact shoe 33 of a similar size and shape as the abrading tool is mounted on the end 34 of a shaft which is free to rotate in the bearing 31. This contact shoe is also provided with a circumferential V-shaped groove 35, simulating the groove in the abrading tool. It is to be noted that the contact shoe 33 and abrading tool 27 are retained in given spaced relation with each other and the said shoe has a floating rotary connection on the end 34 of the shaft, so that it may be rotated independently of the tool.

It is extremely essential in bevelling the edges of lenses to form the bevel so that the apex thereof will be located in desired relation with the edge. To obtain the initial spaced location of the lens relative to the former, gauge means, such as illustrated at 36, are provided. This gauge means constitutes a bearing 37 carried by a rock lever 38 which is pivotally attached at 39 to the head of the device. A sleeve 40, having a bevelled former contact 41 thereon is slidably supported in the bearing 37, so that the grooved portion of the former contact 41 may be positioned in aligned relation with the bevelled contour edge of the former 22. Internally of the sleeve 40 there is slidably and adjustably supported a rod 42 having a transverse bearing 43 adjacent one end thereof, in which a gauge contact 44 is adjustably supported and held in adjusted position by a clamped screw or the like 45. The opposed end of the rod 42 is provided with a threaded portion 46 on which an adjustable nut 47 is rotatably supported. The sleeve 40 is provided with an internal slot 48 in which is slidably mounted a key 49 carried by the rod 42. This is to hold the contact 41 and gauge contact 44 in axial relation with each other. The bevelled contact 41 and the gauge contact 44 are normally urged in a direction away from each other through the action of a coil spring or the like 50, which engages a collar 51 carried by the rod 42 adjacent one end thereof and a shoulder 52 internally of the sleeve 40. By adjustment of the nut 47 on the threaded portion 46 of the rod, the distance between the contact end 53 of the gauge contact 44 and the apex of the groove in the member 41 may be altered. A suitable scale member 54 is provided on the rod 42, whereby the extent of adjustment between the contact member 44 and end 53 of the gauge contact may be positively determined. This gauge, as stated above, is for the purpose of locating the lens 9 in proper abrading relation with the bevelled groove of the tool 27, that is, so that when the lens is reduced to size and desired contour shape as controlled by the shape of the former 22, the apex of the bevel formed on the edge of the lens will be in desired location relative to the opposed surfaces of the lens. This is controlled by placing a suitable indication mark or the like on the lens which is to be edged at substantially a point inwardly of the edge of the lens to which the finished bevel edge is to be located, relative to the center of the lens.

The bevelled portion of the contact member 41 is first placed in contact with the bevelled edge of the former 22. The end 53 of the gauge contact 44 is then adjusted so as to overlie the mark or other diameter indication on the lens 9. Of course, it is to be understood that the lens has been properly positioned between the contact members 8 and 15 prior to said gauging. The rod 42 is then adjusted to zero position indicated on the scale 54, which position normally locates the end 53 at a spaced relation relative to the apex of the groove in the member 41 substantially equivalent to the distance between the apices of the grooves in the abraded tool 27 and contact shoe 33. The lens 9 is then adjusted into engagement with the end 53 of the gauge means 44 by rotation of the hand nut 11. This rotation of the hand nut 11 in one or the other direction will allow the resilient means 17 to move the lens clamping means longitudinally of the bearings 3 and 4, so that the mark on the lens may thereby be adjusted into engagement with the end 53 of the gauge contact 44. When in this position, the amount of adjustment necessary to locate the apex of the finished bevel on the edge of the lens in desired position is then determined and further adjustment of the rod 42 inwardly or outwardly, as required, is effected and the extent of this adjustment is positively determined by the scale means 54. If the lens in the vicinity of the gauge point 53 is 2 mm. thick and it is desired to form the apex of the bevel intermediate the opposed surfaces of the lens at said location, the contact point 53 is backed away from the lens 1 mm., as controlled by the scale 54, and the lens 9 is then adjusted into engagement with said contact point 53. This locates the lens in desired relation with the abrading tool 27, so that when reduced to size, the apex of the bevel on the edge of the lens will be in proper location. After the position of the lens has been determined as specified above, the gauge means 36 is swung clear of the lens about its pivotal connection 39 with the head of the device.

It is to be noted that the speed of rotation of the abrading tool is much faster than the rotation of the lens, and that the lens is adapted to be fed into the abrading tool under the action of a spring, weight or the like 55. The operation is such that the lens is initially fed into the abrading tool an amount sufficient to allow the former 22 to engage the contact shoe 33. When in this position the rotation of the former will cause the said contact shoe to rotate through frictional contact. The lens is then slowly rotated substantially one complete revolution, or slightly more, and is thereby reduced to size and the bevel simultaneously formed thereon. With this type of abrading tool it is not necessary to first cut the lens to approximate size, as has been usual in the past. The said lens, however, may be previously cut, if desired, so that a more positive gauge set-up may be obtained.

The abrading tool 27, as shown in Figs. IV and V, is preferably formed of two sections 56 and 57. The section 56 is provided with a hub 58 having a tapered bore 59 adapted to fit the tapered end of the shaft 29.

The section 56 is provided with a bevelled surface 60 adapted to cooperate with a similar bevelled surface 61 on the section 57, so as to provide a V-shaped groove when the sections 56 and 57 are in assembled relation with each other. The section 57 is provided with a central hollowed out portion 62 having a bevelled portion 63, which is so angled as to fit substantially the bevel 60 on the face of the section 56. Suitable clamp screws or the like 64 are provided for holding the sections 56 and 57 in assembled relation with each other. The bevelled surfaces 60 and 61 are impregnated with abrasive particles, such as crushed diamonds, sapphires, carborundum or the like, which in this particular instance are anchored in said surfaces by forming a plurality of spaced cuts 65 in said bevelled surfaces 60 and 61. These cuts 65 are formed by suitable chisel-like tools 66, such as shown in Figs. VI and VII. A cut of the shape of the tool 66 is first formed in the surface 60 or 61, as the case may be, is filled with particles of crushed diamonds or other suitable abrasives, and the side walls of the cut are then forced toward each other so as to engage with and hold the particles of abrasive therein. The particles of abrasive are preferably mixed with a suitable conveying substance, such as sheep fat or the like. The closing in of the side walls of the cut to secure the particles of abrasive therein is accomplished simultaneous to the forming of the next adjacent cut in the face, that is, the first cut is formed, the particles or abrasive held in the conveying substance are pressed in said cut, and the next successive cut is formed adjacent said first cut by the tool 66. The tool 66 is so shaped that in forming the next adjacent open cut, the walls of the first cut will be displaced so as to close in and secure the particles of abrasive in said cut. The cuts are successively formed, filled and closed in this manner throughout the contour of said members or sections 56 and 57. After the cuts have been formed and filled throughout the contour of said sections 56 and 57, the abrading surfaces 60 or 61, as the case may be, are trued by a suitable shaping tool 67. Care is taken that in forming said trued surfaces that the finished sections will be of substantially the same diameter. During continued use the surfaces 60 and 61 may be dressed and trued so as to maintain the desired effective abrading qualities of the tool. The body of the sections 56 and 57 may be formed of any desirable, workable metal, such as copper alloy, nickel alloy, steel, etc., having a certain degree of softness which will enable the ready working thereof. When it is desired to retrue the tool and to reexpose the cutting edges of the abrasive particles, the face 60 or 61, as the case may be, is etched by a suitable acid, such as hydrofluoric acid, or other acid which will remove a controlled amount of the metal surrounding the outer particles of abrasive and cause a given portion of the cut edges thereof to be exposed. This may also be accomplished by subjecting the face of the tool to a suitable abrasive treatment wherein a given amount of the supporting metal surrounding the abrasive particles may be removed.

If desired, the supporting metal of the tool, in the vicinity of the abrasive particles, may be hardened to a controlled degree, depending, of course, upon the nature of the material used. In this instance, the degree of hardening is controlled so as to cause the wear of the supporting metal to substantially keep pace with the wear of the cutting edges of the abrasive particles, so as to tend to insure a more positive supporting of the abrasive particles during the use of the tool, so that the particles will not become dislodged and displaced from the working face of the tool prior to performing the full extent of their usefulness.

The cuts 65 are preferably angled in the direction of rotation of the tool, as indicated by the arrow 68 in Fig. VII, so that the abrading pressure on said abrasive particles will tend to force the abrasive particles inwardly of the cuts rather than tend to displace the particles from the face of the tool.

The angling of said cuts is diagrammatically illustrated at 69.

By forming the tool in two separate sections 56 and 57, the surfaces 60 and 61 may be easily retrued and a sharp apex of the bevelled groove formed by said two sections may be maintained. This is because of the fact that the angled portion 63 of the section 57 is adapted to be drawn into clamped engagement with the bevelled surface 60 and thereby forms a sharp apex. The truing of the surfaces 60 and 61 results only in a slight change in diameter of the tool and this may be compensated for by any suitable adjustment means known in the art, but in most instances, is so slight that it may be neglected.

A modified form of tool is illustrated in Fig. IX, wherein the abrading faces 70 and 71 are preferably formed of a mixture of abrasive particles and granules of metal which are joined with each other by pressure and by a sintering process for holding the abrasive particles therein. It is to be noted that the supporting discs 72 and 73, or the sections 56 and 57, may be provided with annular members 74 and 75, having the abrading surfaces 70 and 71 thereon. The said annular members may be secured to said discs 72 and 73 by soldering or the like, as illustrated at 76. The entire annular members 74 and 75 may be formed of sintered metal with only the affecting abrading surfaces 70 and 71 thereof formed of a mixture of particles of abrasives and metal joined by a sintering process. With this arrangement only the annular members 74 and 75 need to be replaced when the effective abrading surfaces thereof have become worn and impractical for use. It is to be understood that the abrading tool illustrated in Fig. IV may be provided with annular members simulating the members 74 and 75, if desired. Although a sintering process has been described it is to be understood that the abrasive particles might be supported by any suitable bonding means or material, such as artificial resins, Bakelite or the like or by any suitable means.

The effective abrading surfaces 70 and 71 may be hardened to any desired degree of hardness in a manner similar to that described above in connection with the tool illustrated in Fig. IV.

From the foregoing description it will be seen that novel means and methods have been provided for accomplishing all of the objects and advantages of the invention, particularly that of providing a bevelling tool which will be resistant to wear and by which a sharp apex may be maintained in the V-shaped bevel face thereof and the position of the bevel on the resultant lens may be positively controlled.

Having described my invention I claim:

1. In a device of the character described the combination of an abrading tool and a former contact shoe each having a peripheral groove of similar shape therein, said grooves being in substantially given spaced relation with each other, a head having a rotatable work support thereon for supporting work for engagement with the peripheral groove of the abrading tool, a former on said head adapted to be rotated simultaneously with the work support and the work carried thereby and adapted to engage the peripheral groove in the contact shoe and means for varying and controlling the distance between the work and the former according to the given distance between the respective peripheral grooves of the abrading tool and the contact shoe to so locate the work relative to the abrading tool that the resultant edge formed on the work at the finished depth of abrading will be substantially accurately centered with respect to the groove in the abrading tool.

2. In a device of the character described the combination of a rotatably supported abrading tool and a former contact shoe each having a similarly formed V-shaped peripheral groove therein, said grooves being in given spaced relation with each other, a head having a rotatable lens support thereon for supporting a lens for engagement with the peripheral groove of the abrading tool, a former on said head adapted to be rotated simultaneously with the lens support and lens carried thereby and adapted to contact the shoe within the peripheral groove thereof and means for varying and controlling the distance between the lens and the former according to the distance between the respective peripheral grooves of the abrading tool and contact shoe to so locate the lens relative to the abrading tool that the resultant edge formed on said lens at the finished depth of abrading will be substantially accurately centered with respect to the groove in the abrading tool.

3. In a device of the character described the combination of an abrading tool and a former contact shoe each having a similarly formed V-shaped peripheral groove therein, said grooves being in substantially fixed spaced relation with each other, a head having a rotatable lens support thereon for supporting a lens for engagement with the abrading tool, a former on said head adapted to be rotated simultaneous with the lens support and the lens carried thereby and adapted to engage the contact shoe within the peripheral groove thereof, gauge means having a grooved portion for engaging the former and having an adjustable contact portion adjacent the opposed end thereof for engaging the side surface of the lens, the distance between the grooved portion and the contact portion of said gauge means being so controlled as to be substantially equal to but less than the distance between the grooves in the abrading tool and the contact shoe by an amount substantially equal to half the thickness of the lens and means for varying the distance between the lens and the contact shoe whereby the said lens may be adjusted to engage the side surface thereof with the contact means substantially at the line of the depth to which the said lens is to be abraded whereby the edge of the lens at said finished depth will be substantially accurately centered with respect to the groove in the abrading tool.

4. In a device of the character described the combination of a disc type abrading tool having a peripheral V-shaped groove therein and a disc type contact shoe having a V-shaped peripheral groove therein simulating the groove in the abrading tool, said abrading tool and contact shoe being supported for rotation independently of each other, said grooves being in substantially fixed spaced relation with each other, a head having a rotatable lens support thereon for supporting a lens for engagement with the abrading tool, a former on said head adapted to be rotated simultaneously with the lens support and lens carried thereby and adapted to engage the contact shoe within the peripheral groove thereof and means for varying and controlling the distance between the lens and the former to position the lens relative to the abrading tool when the former is in engagement with the groove of the contact shoe so that the resultant edge formed on the lens at the finished depth of abrading will be substantially accurately centered with respect to the groove in the abrading tool.

5. In a device of the character described the combination of a pair of spaced members, one constituting a rotatably supported abrading tool and the other a former contact shoe each having a similarly formed peripheral groove therein and a second pair of spaced members one constituting a rotatable work support and the other a former adapted to be rotated simultaneously with the work support, one of said pair of spaced members being in relatively fixed spaced relation with each other and the other of said pair of spaced members having embodied therewith means for varying and controlling the distance between said spaced members relative to the distance between the other of said pair of spaced members whereby work carried by said work support when the former is in position in the peripheral groove of the former shoe may be so related with the groove of the abrading tool that the edge of the work substantially along the line of the finished depth to which the work is to be abraded will be substantially accurately centered with respect to the groove in the abrading tool.

6. In a device of the character described the combination of a pair of spaced members, one constituting a rotatably supported abrading tool and the other a former contact shoe each having a similarly formed V-shaped peripheral groove therein and a second pair of spaced members one constituting a rotatable lens support and the other a former adapted to be rotated simultaneously with the lens support, one of said pair of spaced members being in relatively fixed spaced relation with each other and the other of said pair of spaced members having embodied therewith means for varying and controlling the distance between said spaced members relative to the distance between the other of said pair of spaced members whereby a lens carried by said lens support when the former is in position in the peripheral groove of the former shoe may be so related with the V-shaped groove of the abrading tool that the edge of the lens substantially along the line of the finished depth to which the lens is to be abraded will be substantially accurately centered with respect to the V-shaped groove in the abrading tool.

LLOYD W. GODDU.